United States Patent
Frati et al.

(10) Patent No.: US 9,119,337 B2
(45) Date of Patent: Sep. 1, 2015

(54) FOLDABLE MULTIPURPOSE APPARATUS

(75) Inventors: Gabriele Frati, Maniago (IT); Nicola Belli, Marghera (IT); Roberto Gorza, Pedavena (IT)

(73) Assignee: ORESTE FRATI S.r.l., Maniago (IT)

( * ) Notice: Subject to any disclaimer, the term of this patent is extended or adjusted under 35 U.S.C. 154(b) by 127 days.

(21) Appl. No.: 13/884,762

(22) PCT Filed: Nov. 10, 2011

(86) PCT No.: PCT/EP2011/069793
§ 371 (c)(1),
(2), (4) Date: May 10, 2013

(87) PCT Pub. No.: WO2012/062833
PCT Pub. Date: May 18, 2012

(65) Prior Publication Data
US 2013/0233582 A1    Sep. 12, 2013

(30) Foreign Application Priority Data

Nov. 11, 2010   (IT) ................................ PN2010A0063

(51) Int. Cl.
*A01B 1/02* (2006.01)
*A01B 1/22* (2006.01)

(52) U.S. Cl.
CPC ................. *A01B 1/225* (2013.01); *A01B 1/022* (2013.01)

(58) Field of Classification Search
CPC .......... A01B 1/225; A01B 1/22; A01B 1/222; E01H 5/02; B25G 1/04; B25G 1/06; B25G 1/066

USPC ........... 172/371, 372, 378, 381; 294/51, 53.5, 294/54.5, 57

See application file for complete search history.

(56) References Cited

U.S. PATENT DOCUMENTS

| | | | | |
|---|---|---|---|---|
| 261,894 | A | * | 8/1882 | Albers .......................... 294/53.5 |
| 437,180 | A | * | 9/1890 | Depp ................................ 7/114 |
| 856,575 | A | | 6/1907 | Elliot |
| 1,029,967 | A | | 6/1912 | Bolin et al. |
| 1,059,054 | A | | 4/1913 | Lindelien |
| 1,184,821 | A | | 5/1916 | Cantley |
| 1,266,921 | A | | 5/1918 | Cremers |
| 1,478,204 | A | | 12/1923 | Cooney et al. |
| 1,500,132 | A | * | 7/1924 | Hummelgard .................. 294/51 |

(Continued)

FOREIGN PATENT DOCUMENTS

WO    96 41513    12/1996

OTHER PUBLICATIONS

International Search Report Issued Feb. 13, 2012 in PCT/EP11/69793 Filed Nov. 10, 2011.

*Primary Examiner* — Thomas B Will
*Assistant Examiner* — Jessica H Lutz
(74) *Attorney, Agent, or Firm* — Oblon, McClelland, Maier & Neustadt, L.L.P.

(57) ABSTRACT

A foldable multipurpose apparatus including a tool, a gripping mechanism, and a connecting element, extending along a first axis between the tool and the gripping mechanism, the tool being articulated at one end of the connecting element around a second axis transversal to the first axis, the gripping mechanism being articulated at an opposite end of the connecting element around a third axis separated from the second axis and transversal to the first axis. The second transversal axis and the third transversal axis are perpendicular to each other.

12 Claims, 6 Drawing Sheets

(56) References Cited

U.S. PATENT DOCUMENTS

| | | | |
|---|---|---|---|
| 1,519,892 A | 12/1924 | Webster | |
| 1,542,652 A | 6/1925 | Anderson | |
| 1,687,953 A * | 10/1928 | Starks | 403/58 |
| 1,800,349 A * | 4/1931 | Hurason | 403/57 |
| 2,098,609 A | 11/1937 | Bishop | |
| 2,419,719 A * | 4/1947 | Kennedy | 172/372 |
| 2,529,342 A | 11/1950 | Kopplin et al. | |
| 2,833,585 A | 5/1958 | Nischan | |
| 3,401,971 A | 9/1968 | Cronquist | |
| 3,993,340 A * | 11/1976 | Rusing et al. | 294/53.5 |
| 4,180,289 A | 12/1979 | Faine | |
| 4,264,095 A * | 4/1981 | Lemasters | 294/53.5 |
| 4,424,997 A | 1/1984 | Jackson | |
| 4,475,757 A | 10/1984 | Glock | |
| 4,565,398 A * | 1/1986 | Poulin | 294/52 |
| RE32,266 E * | 10/1986 | Tuggle et al. | 172/15 |
| 4,700,420 A | 10/1987 | Belanger | |
| 4,929,112 A * | 5/1990 | Wilcox | 403/93 |
| 5,103,520 A * | 4/1992 | Mazzo | 7/104 |
| 5,367,737 A * | 11/1994 | Vosbikian et al. | 15/257.2 |
| 5,425,153 A * | 6/1995 | Vosbikian | 15/257.2 |
| 5,547,240 A | 8/1996 | Hartshorn et al. | |
| 5,577,786 A | 11/1996 | Laine | |
| 5,593,198 A * | 1/1997 | Vogel, II | 294/54.5 |
| 5,630,633 A * | 5/1997 | Dupre et al. | 294/53.5 |
| D395,211 S | 6/1998 | Linden et al. | |
| 5,795,000 A | 8/1998 | Aldorasi | |
| 5,810,408 A | 9/1998 | Armstrong | |
| 5,927,779 A | 7/1999 | Aquilina | |
| 5,971,653 A | 10/1999 | Harpell | |
| 6,029,998 A | 2/2000 | Woodard | |
| D426,436 S | 6/2000 | Ng | |
| 6,131,971 A | 10/2000 | Chen | |
| 6,155,620 A | 12/2000 | Armstrong | |
| 6,237,258 B1 * | 5/2001 | Biro | 37/285 |
| 6,290,273 B1 * | 9/2001 | Moisan | 294/54.5 |
| 6,315,341 B1 | 11/2001 | Leon et al. | |
| 6,332,635 B1 | 12/2001 | Harpell | |
| 6,412,843 B1 | 7/2002 | Burbrink et al. | |
| 7,017,234 B2 | 3/2006 | Anderson | |
| 7,032,941 B2 | 4/2006 | Heneveld | |
| 7,121,599 B2 | 10/2006 | Demar et al. | |
| 7,219,382 B2 | 5/2007 | Johnson | |
| D551,524 S * | 9/2007 | Norton et al. | D8/10 |
| 7,464,440 B2 * | 12/2008 | Decker | 16/422 |
| 7,571,945 B2 | 8/2009 | Walker et al. | |
| D618,973 S * | 7/2010 | Gosselin | D8/10 |
| 7,946,637 B1 | 5/2011 | Gehman et al. | |
| 7,950,085 B2 * | 5/2011 | McGovern | 7/116 |
| 8,002,322 B2 | 8/2011 | Rathmell et al. | |
| 8,092,111 B2 * | 1/2012 | Wu | 403/102 |
| 8,220,852 B2 | 7/2012 | Fenstemaker | |
| 8,444,192 B2 * | 5/2013 | Pavlic | 294/9 |
| 8,800,175 B1 * | 8/2014 | Faraci et al. | 37/273 |
| 2002/0184713 A1 | 12/2002 | Dallas et al. | |
| 2003/0028988 A1 * | 2/2003 | Streutker et al. | 15/228 |
| 2003/0184104 A1 | 10/2003 | Ping | |
| 2005/0134064 A1 | 6/2005 | Nies | |
| 2005/0212315 A1 * | 9/2005 | Jean | 294/51 |
| 2006/0000041 A1 * | 1/2006 | Streutker et al. | 15/144.1 |
| 2006/0138792 A1 | 6/2006 | Heneveld, Sr. | |
| 2007/0145757 A1 | 6/2007 | Wu | |
| 2008/0185857 A1 * | 8/2008 | Westgarde et al. | 294/54.5 |
| 2008/0276396 A1 | 11/2008 | Lucero | |
| 2011/0018226 A1 * | 1/2011 | Jessie, Jr. | 280/282 |
| 2011/0037281 A1 | 2/2011 | Cox | |
| 2012/0049550 A1 | 3/2012 | Gehman et al. | |
| 2013/0168983 A1 | 7/2013 | Swanger | |

* cited by examiner

FOLDABLE MULTIPURPOSE APPARATUS

TECHNICAL FIELD OF INVENTION

The present invention relates to a hand apparatus, in particular a tool for working with soil and other loose materials, such as sand or snow, that can be folded on itself.

BACKGROUND OF INVENTION

Hand-operated apparatuses of various kinds for working the soil by hand have always been used by man in farm work. They generally consist of an elongate connecting element, made of wood or metal, to which is connected at one of the two ends the real working tool, generally metallic, having different shapes, depending on the function to perform. The other end of the connecting element serves as a handle to allow the use of the tool.

Although, to maintain economically acceptable quantitative standards, the agricultural field is now largely mechanized, manual tools are still used in the cultivation of small parcels of land, in gardening and small home maintenance operations.

Tools of this type are also supplied in equipment kits to army personnel.

Moreover, recently the market of these tools has also turned to fields other than agriculture, such as sports, in particular mountain climbing and hiking, and in camping equipment.

Consequently, foldable hand apparatuses that can be placed in compact spaces and thus carried where they are to be used, even in remote places, are preferable over traditional ones, whose length could be a hindrance in transportation.

Prior art foldable hand apparatuses, in their most rudimental form, have a simple single joint, generally arranged on the connecting element, and can be folded so that the tool fastened at one end folds back on the other end, the one forming the handle. Unfortunately, the size of the apparatus, even when folded, is not always sufficiently compact to allow it to be easily carried, for example inside a rucksack.

To resolve this problem, the document WO96/41513 issued to Fiskars Consumer OY AB discloses a foldable hand apparatus provided with two joints: a first pin rotatably connects the tool to the connecting element, while a second pin rotatably connects the connecting element to the handle. In this manner, the size of the folded apparatus is rather compact.

One drawback found in that known solution lies in the fact that both said two joints have axes of rotation that are transversal to the connecting element and parallel to each other: in this manner, when a force is applied on the apparatus during its normal use, there is the risk that one of the two pins, particularly the second one, that is under the greater strain, yields, thus causing the tool to accidentally fold back on itself at an inappropriate moment. This problem is already pointed out in the above-mentioned document which, in fact, to avoid this problem, proposes an apparatus provided with a further element, a slidable sleeve arranged to protect and reinforce the second joint, which must be lifted to perform the actions of opening/folding the apparatus, thus making them rather complicated and time-consuming.

In addition, since the apparatus must be such as to be used by both right-handed and left-handed users, the handle has been proposed in a triangular shape and rather narrow, to contain its size: for this reason, it may be found to be not very practical for a user that grips it wearing gloves.

SUMMARY OF THE INVENTION

The main objective of the subject matter of the present invention is to overcome the drawbacks of the known art by devising a multipurpose hand apparatus that is particularly practical to use and carry.

In the scope of the above objective, one purpose of the present invention is to realize a hand apparatus that can be placed in a very limited space when not in use and that has a particularly compact shape, without projecting portions, so as to make it easier and safer to carry the same even inside a rucksack.

At the same time, however, the apparatus of the present invention must be able to reassure the user against the possibility of undesirable and accidental closing of the same during its use.

Another purpose of the present invention is to provide an easy-to-use apparatus in which the operations of opening or folding it back upon itself are as simple and fast as possible.

Another purpose of the present invention is to achieve a multipurpose apparatus that can be completely and easily disassembled and reassembled for its maintenance.

A further purpose of the invention is to realize a foldable apparatus in which the hand tool can be easily replaced to modify its shape on the basis of necessity and that is also easily adaptable to be used by a left-handed person.

One not least important purpose is to devise a foldable apparatus that can be easily made with the usual well-known systems, machinery and equipment.

The above objective and purposes, and others that will be more evident later herein, are achieved through the construction of an apparatus as defined by claim 1.

BRIEF DESCRIPTION OF THE FIGURES

Advantages and characteristics of the invention will be evident from the description which follows, by way of non-limiting example, with reference to the enclosed figures, wherein.

DETAILED DESCRIPTION OF THE EMBODIMENTS OF THE INVENTION

Figure 1:
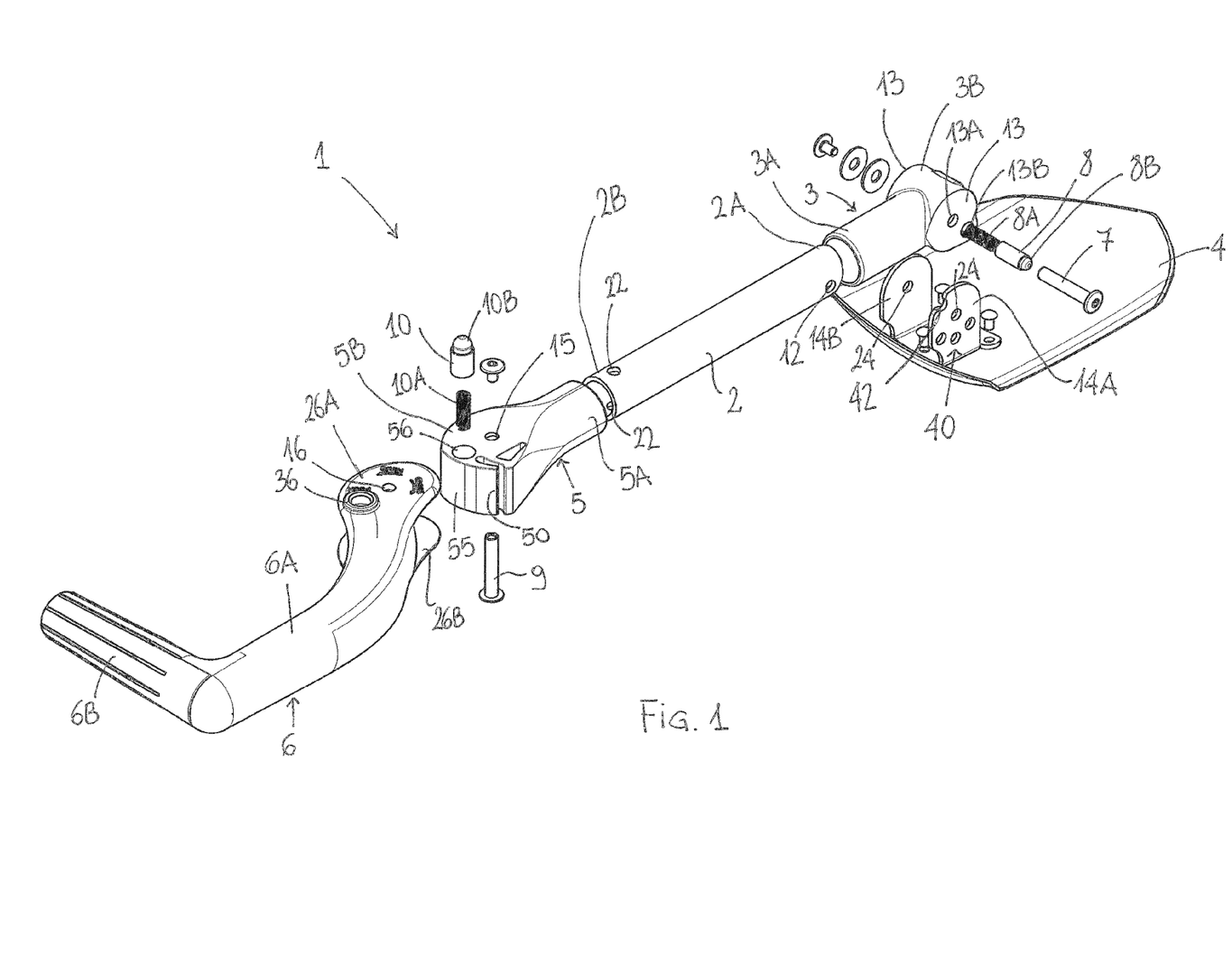
FIG. 1 is an exploded view of an apparatus according to the present invention.

With reference to the above-mentioned figures, in particular FIG. 1, a foldable multifunction apparatus 1 is shown comprising an elongate connecting element 2, extending along a first axis X-X, to which are rotatably connected, at one of the two ends, a hand tool 4, and at the opposite end, a gripping means 6, or handgrip.

As will be explained later in greater detail, the tool 4 and the handgrip 6 can be opened in a first extended, working position, and a second retracted position, in which both are folded on the connecting element 2; in addition to said two positions, the tool 4 can also be set in one or more stable intermediate positions to better adapt to the different working conditions.

The rotatable connection of the tool 4 to said connecting element 2 is achieved by the interposition of a first joining element 3, such as a first sleeve, while the rotatable connection of the grip means 6 to said connecting element 2 is achieved thanks to the interposition of a second joining element 5, such as a second sleeve.

In the enclosed figures, the tool 4 has the shape of a shovel for tilling the soil, but there is nothing preventing it from having other shapes, such as for example a snow shovel or a pick; in effect, one purpose of the present invention is to make it possible to interchangeably mount different tools on the same support structure.

Said connecting element 2 consists substantially of an elongate hollow body, preferably cylindrical, that extends along a first longitudinal axis X-X, and includes a first end portion 2A, provided with a first pair of facing holes 12, designed to be received inside a corresponding hollow end portion 3A of said first sleeve 3, which also has a longitudinal extension along the same axis X-X.

Said first sleeve 3 also includes a second hollow portion 3B, that extends perpendicularly to said first portion 3A, substantially along a second axis Y-Y, so that all in all the first sleeve 3 is in the shape of a T.

The first sleeve 3 can be made as an integral part or the two portions perpendicular to each other can be assembled at a separate moment, for example by welding.

Said second hollow portion 3B is closed at both ends by the closing side walls 13, each of them provided with a second pair of facing holes 13A, preferably arranged in the central portion. One of the two closing walls 13 is also provided with a further through hole 13B, arranged off-centre with respect to the central portion of the same wall.

Two shoulders 14A, 14B, arranged facing each other, rise substantially at right angles on the surface of said tool 4, preferably at an edge portion, to which they are fastened by conventional fastening means.

Said two shoulders 14A, 14B are positioned at a reciprocal distance such as to allow the insertion between them of the second portion 3B of said first sleeve 3, so that the external surfaces of the closing walls 13 are respectively in contact with the facing surfaces of the shoulders 14A and 14B.

In addition, on said two shoulders 14A and 14B there is a third pair of holes 24, that makes it possible to rotatably articulate said tool 4 on said first sleeve 3, around a first transversal pin 7 that extends substantially along said second axis Y-Y. Said first pin 7 may consist, for example, of a male screw and a female screw that are joined to each other by interposing, if necessary, sealing washers, and a Belleville washer to restrain the rotation.

Said first pin 7 is suitable to also cross the second pair of holes 13A, in addition to the third pair of holes 24, so as to rotatably connect the tool 4 to the first sleeve 3, and the first pair of holes 12 provided on the portion of the first end 2A of the connecting element 2 to fasten the latter stably to the first sleeve 3.

On one of the two shoulders (14A in the figures), in particular the one that comes into contact with the wall 13 of the first sleeve 3 provided with the offset hole 13B, is provided a plurality of through holes, generally indicated in the figures by reference number 40: each of said plurality of holes 40, by interacting with a first control means 8 as will be explained later, determines a position of the tool 4 with respect to the connecting element 2. In addition, on the top edge of the same shoulder 14A is also provided a recessed portion 42 which, by interacting with said first control means 8, defines the fully closed position of the tool 4 with respect to the connecting element 2.

In fact, in said offset hole 13B is to be inserted said first control means 8, such as a push button, opposed by a first resilient means 8A, such as a compression spring inserted in the offset hole 13B substantially coaxially with said first push button 8.

The functioning of this first rotatable connection between the tool 4 and the connecting element 2 is as follows: the head 8B of said first push button 8 is adapted to interact with said plurality of holes 40, by inserting itself selectively into one of them, thus locking the rotation of the tool 4 around said first pin 7 and consequently fixing a working position of the tool 4 with respect to the connecting element 2.

To vary the position of the tool 4, it is necessary to apply an axial force on the push button 8 such as to overcome the opposing force exerted by said spring 8A: in this manner, the head 8B of said second push button 8 becomes detached from the hole in which it was engaged, thus freeing the rotation of the tool 4 around the pin 7.

Then, by releasing the push button 8 and rotating the tool 4 so that the head 8B can exit again from a different hole of said plurality of holes 40, the tool 4 is locked in a different working position.

Figure 2:
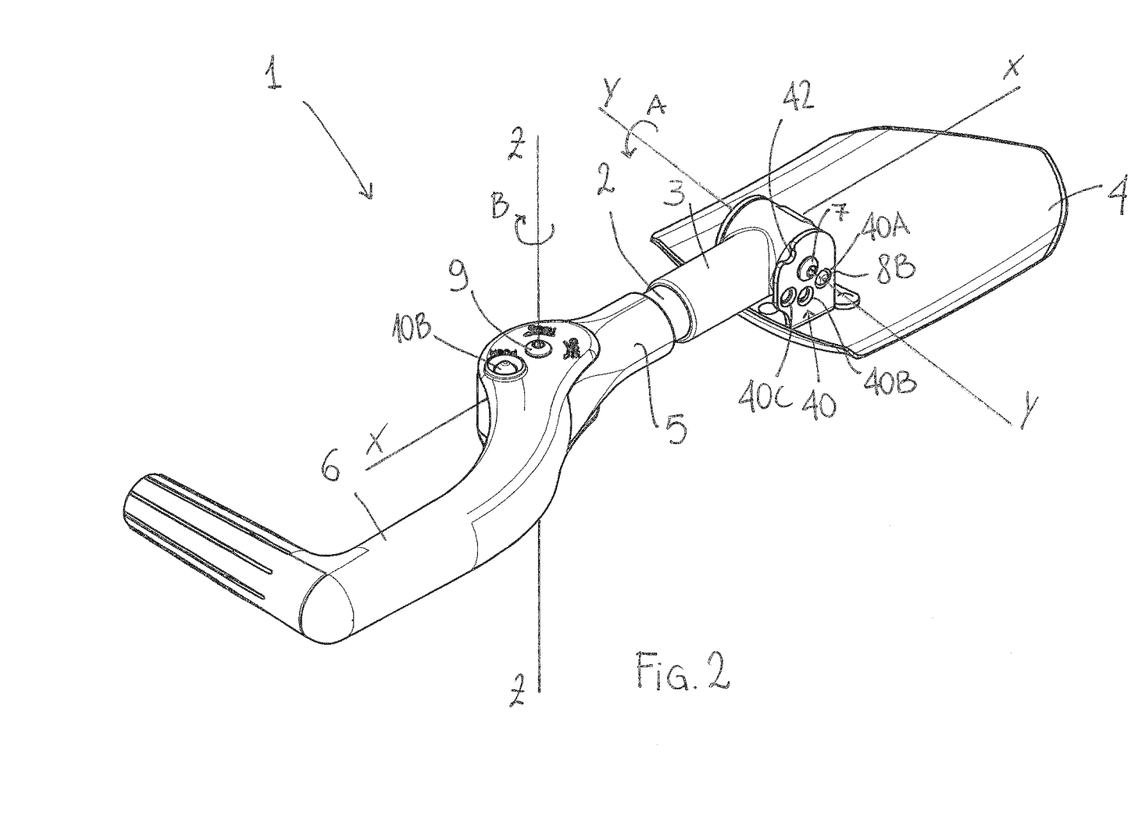
FIG. 2 is a perspective view of an apparatus according to the present invention in the completely extended configuration.

Advantageously, and as shown in the enclosed figures, the plurality of holes 40 includes three holes 40A, 40B and 40C, arranged substantially along an arc, which determine respectively a first position in which the tool 4 extends along the X-X axis, that is useful for example for a user in the snow, a second position in which the tool 4 is rotated 45° around the Y-Y axis in the direction of rotation shown by the arrow A in FIG. 2, that is advantageous for example when used in working with soil, and a third position in which the tool 4 is rotated 90° around the Y-Y axis, to be used for example as a hoe. Naturally, it will be sufficient to add additional holes on said shoulder 14A to allow different inclinations of the tool 4, also based on the use of a type of tool different from the one shown in the figures, such as for example a pick.

Figure 3:
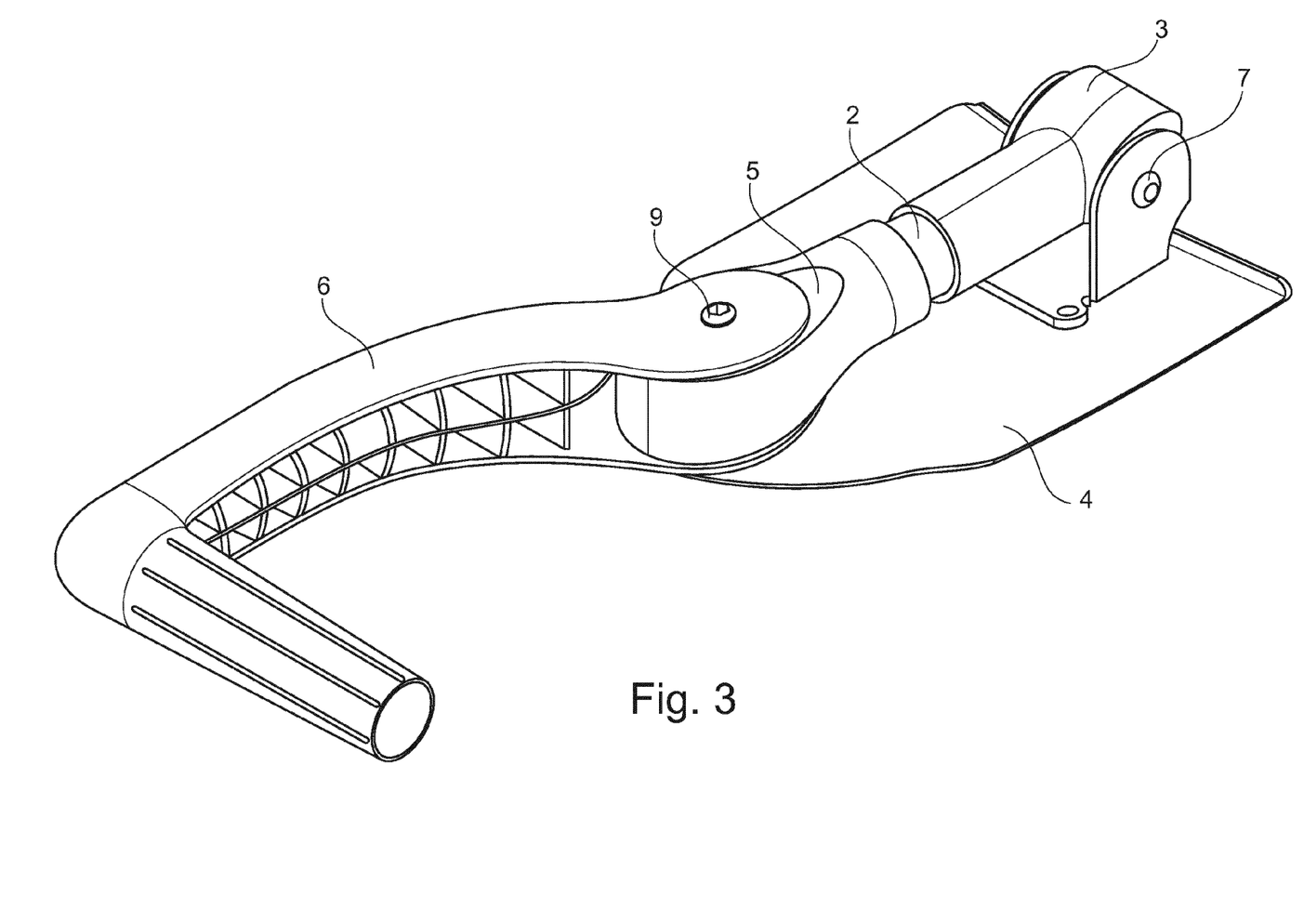
FIGS. 3 and 4 illustrate the apparatus of FIG. 2, respectively, in the partially folded and totally folded configurations.

Finally, to obtain the position in which the tool 4 is completely folded back upon the connecting element 2, as shown in FIG. 3, it is necessary for the head 8B of the first push button 8 to be arranged so as to be engaged in the seat 42, thus preventing the backward rotation of the tool 4.

Advantageously, the end 2A of said connecting element 2 can be cut according to an inclined plane to avoid interfering with the movement of the first push button 8.

The second end portion 2B of the connecting element 2, opposite to said first end portion 2A, is provided with a fourth pair of facing holes 22, arranged at a 90° angle with respect to said first pair of holes 12. The second end portion 2B is adapted to be received inside a second joining element 5 that rotatably connects said connecting element 2 to said gripping means 6, or the handgrip of the tool.

Said second joining element 5, or second sleeve, consists substantially of a first hollow, elongate portion 5A joined preferably without discontinuity to a second portion 5B having at least one wider section and including at least two flattened faces having, at the central portion, a fifth pair of facing holes 15.

Only one of the two flattened faces, in the figures the one facing upwards, is crossed by a further hole 56, arranged off-centre and offset axially in the direction of the handgrip 6, in which are inserted coaxially a second control means 10, such as a second push button, and an opposing resilient means 10A, such as for example a compression spring.

The head wall 55 of the second sleeve 5 is rounded and provided with an elastically deformable portion 50, suitable to interfere as a cam with a corresponding wall 60 provided in the body of the handgrip 6, as will be explained in greater detail later.

The handgrip 6 includes a rigid body having a substantially "L" shape, in which a first side 6A extends substantially along said first axis X-X, and a second portion 6B, arranged preferably perpendicularly to said first portion 6A, is adapted to be gripped by the user both when using the apparatus 1 and also when carrying the same apparatus in its completely folded configuration.

Said first portion 6A ends with two facing portions 26A, 26B jutting toward the connecting element 2, that is, two shoulders on which is provided a sixth pair of holes 16; in addition, one of said two shoulders, indicated in the figures with reference number 26A, is provided with a further off-centre hole 36.

The distance between said two shoulders 26A, 26B is such as to allow the insertion between them of the second portion 5A of the second sleeve 5, so that the fifth pair of holes 15 overlaps the sixth pair of holes 16 and the hole 56 in which the second push button 10 is inserted overlaps the off-centre hole 36.

A second pin 9, for example in the form of a male screw inserted into a female screw, extending along a third axis Z-Z perpendicular to both said first axis X-X and said second axis Y-Y, makes it possible to rotatably join the handgrip 6 to the second sleeve 5, as well as to stably join the connecting element 2 to the second sleeve 5: said second pin 9 is in fact suitable to cross, respectively, the sixth pair of holes 16, the fifth pair of holes 15, and the fourth pair of holes 22.

The operation of the rotating connection between said connecting element 2 and said grip means 6 is as follows: when the apparatus 1 is in a fully open configuration, the head 10B of said second push button 10 engages in the opening of the offset hole 36 of the gripping means 6, locking in this manner the relative rotation of the two elements around the axis Z-Z, defined by the pin 9.

Figure 5:
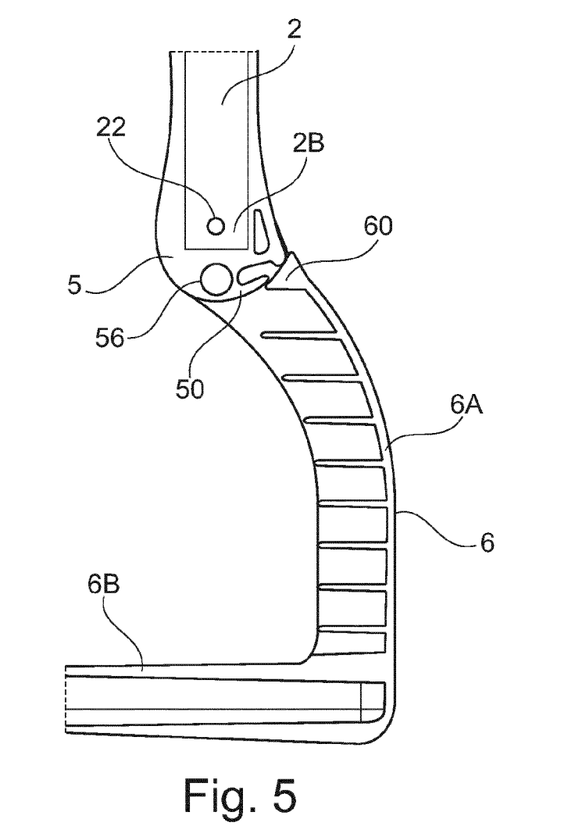
FIGS. 5 and 6 are cross-sectional views illustrating the rotatable joining mechanism between the grip means and the connecting element of an apparatus according to the present invention.
Figure 6:
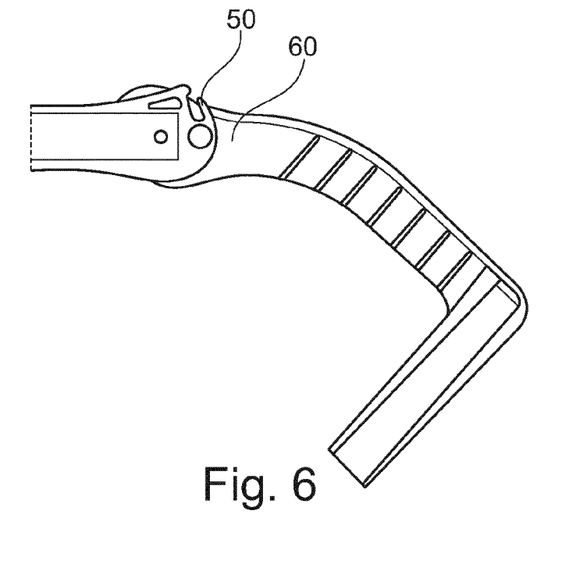
Figure 7:
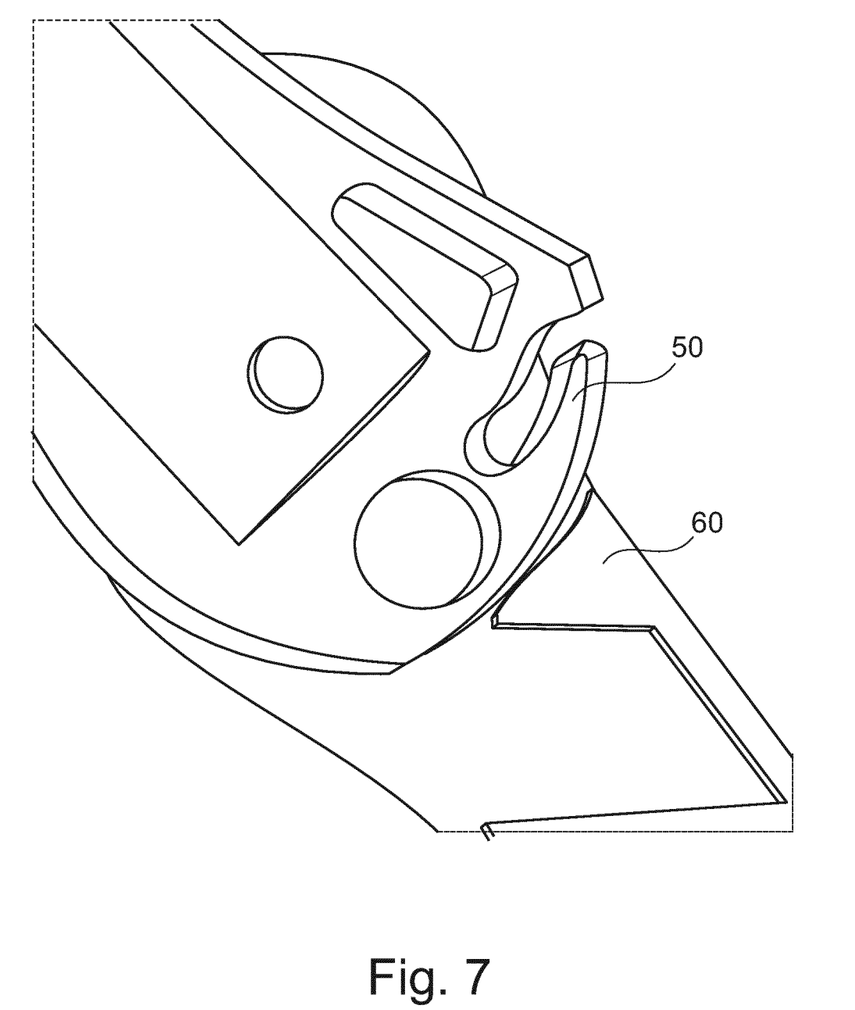
FIG. 7 illustrates an enlarged detail of FIG. 6.

This position is maintained stable, thanks also to the action of the elastically deformable portion 50, which, having a cam-like profile with respect to the position of the second pin 9, comes to interfere with a corresponding projecting wall 60 provided inside the handle body 6, as shown in FIGS. 5, 6 and 7. In this manner, the friction between the elastically deformable portion 50 and the wall 60 is increased by effect of the springback of the elastically deformable portion 50 on the wall 60 caused by the mutual interference.

The complete folding back of the handle 6 is possible through its rotation around the Z-Z axis, as indicated by the arrow B of FIG. 2: the user must apply an axial force on the second push button 10 to oppose the resilient action of the spring 10A, so that the head 10B of the same push button becomes disengaged from the off-centre hole 36, thus freeing the rotation of the handgrip 6 around the pin 9.

The user can then move the handle 6 by rotating it around the third axis Z-Z until it is folded back against the connecting element 2, which movement is opposed only initially by the interference between the elastically deformable portion 50 and the wall 60.

Figure 4:
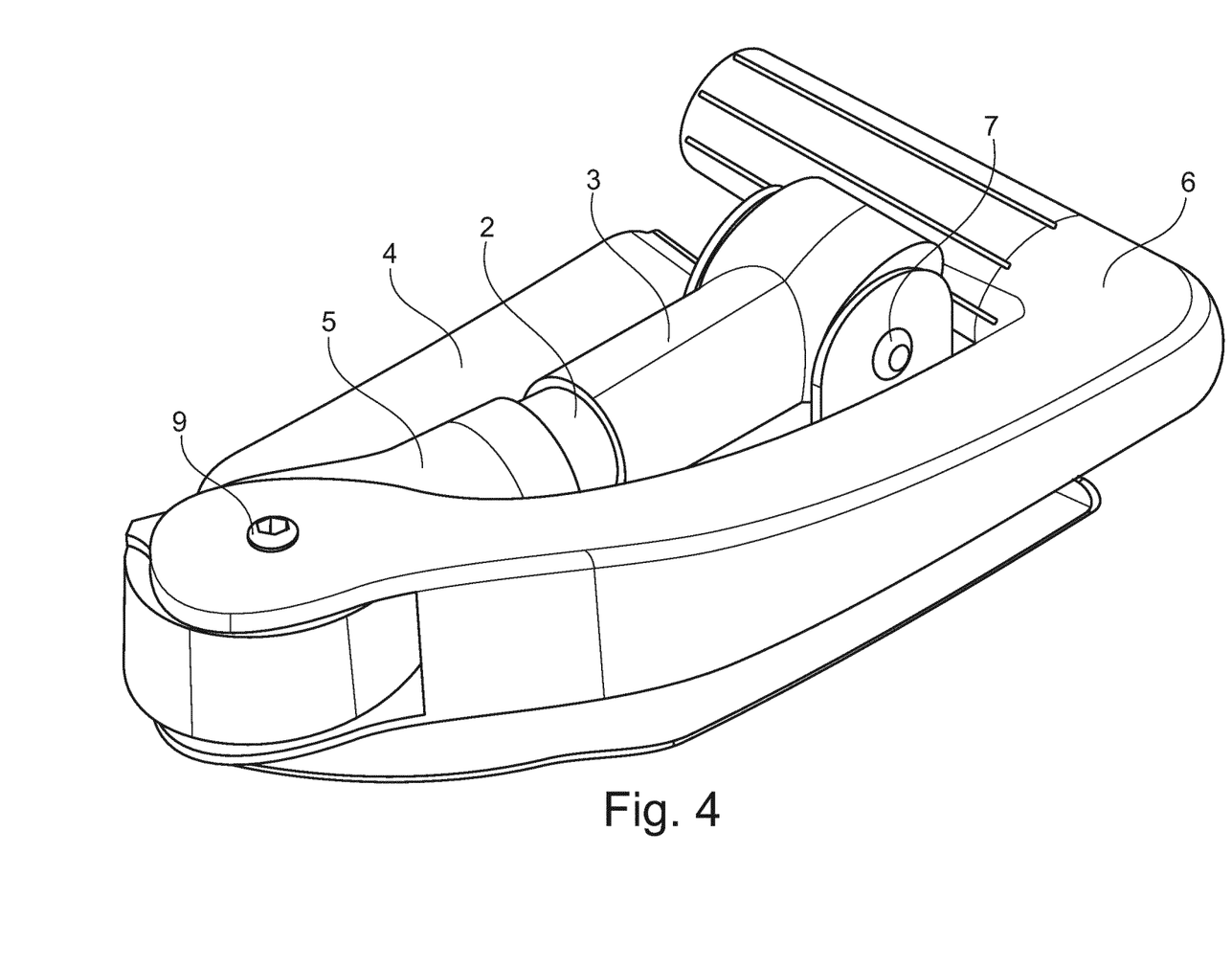

The configuration of the handle 6 completely bent backward, shown in FIG. 4, is maintained thanks simply to the frictional action exerted by the second push button 10, the head of which 10B is made to adhere against the internal surface of the shoulders 26A, 26B by the action of the spring 10A, as well as by the friction exerted by the second pin 9 against the wall of the fifth pair of through holes 15.

When wishing to open the apparatus 1 from the folded-back configuration it is necessary to rotate the handle 6 in the opposite direction until the head 10B of the second push button 10 becomes engaged again inside the off-centre hole 36.

Advantageously, the head of said first and second push button 8B, 10B can be shaped in the form of a variable radius cusp, so as to favour, after the action of the user on the push button, the fast disengagement of the same push button from a hole of said plurality 40 provided on the shoulder of the tool 4 and from the off-centre hole 36, allowing the rotation of the handle 6 around the second pin 9.

As can be immediately sensed by an expert in the field, the apparatus 1 according to the present invention may be easily modified in order to telescopically extend the connecting element 2, with widely known means and procedures, so as to make it adjustable in length.

From the above, it is thus evident how a foldable multipurpose apparatus according to the present invention achieves the initially foreseen purposes and advantages. In fact, an apparatus according to the present invention is absolutely practical to use and can be stored in a very small space when not in use.

When folded, the apparatus has a compact shape, without projecting portions, so as to make it easier and safer to carry the apparatus inside a rucksack.

The particular nature of an apparatus 1 according to the present invention lies in the fact that the tool element 4 is articulated at one end 2A of the connecting element 2 around a second axis Y-Y transversal to the first axis X-X along which said connecting element 2 extends, while the handle 6 is articulated at the opposite end 2B of the connecting element 2 around a third axis Z-Z transversal to said first axis X-X, so that said second axis Y-Y and said third axis Z-Z are perpendicular to each other. In this manner, there is a considerably reduced possibility of the tool accidentally closing when being used.

In addition, the actions required to switch from a position in which the apparatus is completely open, thus when both the tool 4 and the handgrip 6 are extended, to a position in which the apparatus is completely retracted, or the situation in which both the tool 4 and the handle 6 are folded over the connecting element 2, and vice versa, are easy and intuitive, and can be carried out in a few instants.

Moreover, advantageously, the structure of an apparatus according to the present invention gives it the maximum versatility, as it is possible to replace the tool 4 to make it more suitable for a changed situation, or in case of breakage, simply by operating on a single element, that is, on the first pin 7.

The same can be said when wishing to adapt the apparatus for use by a left-handed user: this can be easily done by simply acting on the second pin 9, rotating by 180° the whole unit formed by the second sleeve 5 and the handle 6, and then closing the second pin 9 again.

Further, the particular shape of the handle 6 has been suitably devised for easy handling even by a user wearing gloves.

Moreover, as the tool of the present invention can be completely disassembled, it can also be disposed of once it is no longer usable, according to the material of each component, thus avoiding the undifferentiated disposal and favouring the salvaging/recycling of materials.

Advantageously, a multipurpose apparatus according to the present invention can be easily made with the usual well-known systems, machinery and equipment.

Naturally, the present invention can lead to numerous applications, modifications or variants, without thereby departing from the scope of protection, as defined by the appended claims.

Moreover, the materials and equipment used to achieve the present invention, as well as the shapes and dimensions of the individual components, can be the most suitable for the specific requirements.

The invention claimed is:

1. A multipurpose foldable apparatus comprising:
   a tool including shoulders, at least one of the shoulders including a plurality of holes and a recessed portion on an outer edge of the shoulder;
   a grip including two projecting portions;
   a connecting member, extending along a first axis between the tool and the grip;
   a first joining member interposed between the tool and the connecting member, the first joining member including a first control device configured to interact with the plurality of holes to position the tool in an extended position and at least one intermediate stable position, and the first control device is configured to interact with the recessed portion to position the tool in a retracted position;
   a second joining member rotatably connected to the grip;
   the tool being articulated to an end of the connecting member about a second axis transverse to the first axis;
   the grip being articulated to an opposite end of the connecting member about a third axis separate from the second axis and transverse to the first axis;
   a first plane including the first axis and the second axis is perpendicular with respect to a second plane including the third axis and the second axis;
   at least one of the two projecting portions further comprising an offset hole configured to cooperate with a second control device that defines a first extended position of the grip; and
   the second joining member is provided with a resilient deformable portion that, as the grip is rotated towards the first extended position, is configured to contact a corresponding wall in the grip to thereby elastically deform the resilient deformable portion inward and increase friction between the resilient deformable portion of the second joining member and the corresponding wall in the grip to keep the grip stable in the first extended position.

2. The apparatus according to claim 1, wherein the grip is configured to be positioned in at least the first extended position and a second retracted position by rotating about the third axis.

3. The apparatus according to claim 2, wherein the tool and the grip are rotatably connected to the connecting member respectively by interposing the first joining member and the second joining member.

4. The apparatus according to claim 3, wherein the second joining member comprises a first hollow portion configured to house a second end of the connecting member and a second widened portion comprising at least two flattened faces centrally traversed by a pair of holes mutually facing each other.

5. The apparatus according to claim 4, wherein the two projecting portions mutually face each other and comprise at least one pair of holes facing each other for rotatable connection to the second joining member.

6. The apparatus according to claim 5, wherein the resilient deformable portion is provided on a rounded head wall of the second portion of the second joining member.

7. The apparatus according to claim 5, wherein the second control device includes a spring and a push button biased outward by the spring such that the push button contacts an internal surface of one of the projecting portions to generate friction between the grip and the second joining member when the grip is in the second retracted position.

8. The apparatus according to claim 1, wherein the at least one intermediate stable position is between the extended position and the retracted position.

9. The apparatus according to claim 1, wherein the tool and the grip are rotatably connected to the connecting member respectively by interposing the first joining member and the second joining member.

10. The apparatus according to claim 9, wherein the first joining member comprises a first hollow portion, extending along the first axis and configured to house a first end of the connecting member, and a second hollow portion extending along the second axis, the second portion being laterally closed by two walls centrally traversed by a pair of holes, a first wall of the two walls further including an additional hole arranged offset, and the first control device is inserted through the additional hole of the first wall without passing through a second wall of the two walls.

11. The apparatus according to claim 10, wherein the shoulders include at least two shoulders arranged facing each other, substantially rising forming a right angle from a surface of the tool, the shoulders being arranged at a mutual distance to allow insertion of the second portion of the first joining member for rotatable connection about the second axis.

12. The apparatus according to claim 10, wherein the first control device includes a spring and a push button biased outward by the spring through the additional hole of the first wall.

* * * * *